United States Patent Office 3,202,575
Patented Aug. 24, 1965

3,202,575
COMPOSITION FOR TREATING FASCIOLIASIS
AND METHODS OF TREATMENT
Willem Kruyt, Haarlem, Samuel van der Meer, Amstelveen, and Hendrik Pouwels, Amsterdam, Netherlands, assignors to N.V. Nederlandsche Combinatie voor Chemische Industrie, Amsterdam, Netherlands, a limited-liability company of the Netherlands
No Drawing. Filed Apr. 2, 1963, Ser. No. 269,861
Claims priority, application Netherlands, Apr. 5, 1962, 276,860, 276,861; Feb. 28, 1963, 289,630
5 Claims. (Cl. 167—53)

This invention relates to certain chlorinated bis-phenols which are useful as anthelmintics and particularly effective in combating and preventing fascioliasis.

Fascioliasis, liver rot, or liver-fluke infection is a disease to which sheep and cattle are especially prone, but which may also affect other warm-blooded animals and even man.

Some years ago, chlorinated hydrocarbons were almost exclusively used in the fight against this parasitic disease. These remedies were not really satisfactory because of their high toxicity and, moreover, because of their insufficient effect on the parasite.

However, since the publication of the thesis of K. Hirschler, "Prüfung von Wurmmitteln und pharmakodynamisch wirkenden Substanzen auf Leberegelwirksamkeit bei kleinen Wiederkäuern," Vienna, 1957, 2,2′-methylene-bis(3,4,6-trichlorophenol) or hexachlorophene has also been used in controlling fascioliasis.

Although this new remedy exhibits a stronger effect on the parasite, it still has the disadvantage of considerable toxicity, and moreover several disadvantageous side-effects have been reported. More specifically, among others, the following side-effects and/or toxic effects of hexachlorophene are described in the literature: indigestion, scour, diminished appetite and even death of the treated animals. See, particularly: A. Osinga, T. Diergeneesk. 85, 529 (1960).

Now according to the present invention, it has been found that compounds of the formula:

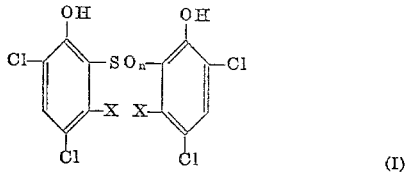

in which X is selected from the group consisting of hydrogen and chlorine atoms and $n$ is two if X represents hydrogen and one or two if X represents chlorine, possess about the same activity as hexachlorophene against liverfluke or fascioliasis, whereas the compounds have advantages over hexachlorophene in relation to the side-effects.

Particularly, it has been found that the toxicity of the compounds according to the present invention is lower than that of hexachlorophene.

The following table compares the $LD_{50}$-values of the compounds according to the invention identified as "1," "2" and "3" in the table with that of hexachlorophene.

TABLE $LD_{50}$ values determined in mice under comparable conditions, after oral administration

| Compound: | $LD_{50}$ in mice, mg./kg. |
|---|---|
| (1) General Formula I in which $n=1$, X=Cl | 710 |
| (2) General Formula I in which $n=2$, X=Cl | 350 |
| (3) General Formula I in which $n=2$, X=H | 770 |
| (4) Hexachlorophene | 90 |

In addition, it has been found that some of the compounds according to the invention possess activity against schistosoma, and that others are effective against pinworm in mice.

The compounds according to the invention identified as 1 and 3 in the above table are known per se, whereas the compound identified as 2 is new.

The preparation of the known compounds has been described by W. S. Gump and J. C. Vitucci, J. Am. Chem. Soc., 67, 238 (1945).

More specifically, W. S. Gump and J. C. Vitucci, describe the preparation of a number of 2,2′-sulfonyl-bisphenols by means of oxidation with hydrogen peroxide, starting from the corresponding 2,2′-sulfinyl derivatives. The 2,2′-sulfinyl-bisphenols, in turn, can be prepared by oxidation of the corresponding thio-bisphenols (for example, as in U.S. Patents No. 2,560,049 and No. 2,661,376). Of course, it is also possible to join the two oxidation steps so as to prepare the sulfonyl-bisphenols directly from the thio derivatives.

However, in their above cited article Gump et al. reported that the oxidation to the corresponding 2,2′-sulfonyl derivative, that is, compound 2 above, could not be realized.

Nevertheless, it has been found that the 2,2′-sulfonyl compound in question, that is, 2,2′-sulfonyl-bis(3,4,6-trichlorophenol), can be prepared in case a sufficient excess of oxidizing agent is used. Starting from 2,2′-sulfinyl-bis(3,4,6-trichlorophenol), at least a five-fold excess of the oxidizing agent has to be used. However, very good results have been obtained by using a thirty-fold excess.

The following example only serves to illustrate the method of preparing the new compound. Variations will be apparent to those skilled in the art.

Example 1

To a solution of 2.89 grams of 2,2′-sulfinyl-bis(3,4,6-trichlorophenol) in 116 mls. of glacial acetic acid there are added 5 mls. of a 30% hydrogen peroxide solution.

The mixture is heated under reflux for one hour. Thereupon, another 5 mls. of the oxidizing agent are added and refluxing is continued for an hour. The foregoing operation is repeated once more, and then the reaction mixture is allowed to cool.

After 24 hours, the crystals formed are filtered, washed with alcohol and dried. The crude 2,2′-sulfonyl-bis(3,4,6-trichlorophenol) can be recrystallized from ethyl acetate yielding 0.9 gram of the pure compound, which melts at 244–245° C.

The present invention also relates to anthelmintic compositions containing one or more of the compounds according to Formula I in association with a diluent or a carrier. The active compounds according to Formula I are hardly soluble in water. Because of this, such active compounds are preferably kept in suspension with the aid of gum arabic and tragacanth or with the aid of carboxymethylcellulose or other thickeners or protective colloids.

Other useful anthelmintic compositions consist of a solution of the active compound in two molar equivalents of alkali, for example, sodium hydroxide.

Other useful compositions in accordance with the invention are those comprising the active compounds in admixture with an edible composition, such as animal feed.

The following examples, which are not intended to be restrictive, only serve to illustrate methods of preparing the compositions for use in treating animals suffering from fascioliasis in accordance with the invention, and variations thereof will be apparent to those skilled in the art.

Example 2

One gram of 2,2′-sulfonyl-bis(3,4,6-trichlorophenol) is finely ground with one gram of a mixture consisting of equal parts of tragacanth and gum arabic. Then 100 mls. of water are gradually added under continuous stirring.

The suspension obtained is administered orally, as such, in therapeutically effective doses, to sheep and cattle suffering from fascioliasis. It is also possible to fill gelatin capsules with the suspension and to treat the affected animals with the same. The dosage required for effective treatment depends upon the size or weight of the animal.

*Example 3*

A mixture of 5 grams of 2,2'-sulfinyl-bis(3,4,6-trichlorophenol) and 5 grams of carboxymethyl-cellulose is finely ground, whereupon 200 mls. of water are gradually added under continuous stirring.

The suspension obtained is administered orally in this form for the control of liver rot in mammalia. It is also possible to administer the suspension in the form of the filling for gelatin capsules.

*Example 4*

Three and nine tenth grams of 2,2'-sulfonyl-bis(4,6-dichlorophenol) are dissolved in 20 mls. of 1 N sodium hydroxide solution.

The solution is administered orally in this form for the treatment of animals suffering from liver-fluke infection.

Another example just as example 1 illustrating the method of preparing the new compound but now starting from the corresponding thio-bis-phenol, follows below:

*Example 5*

Fifty grams of 2,2'-thio-bis(3,4,6-trichlorophenol) are dissolved in 2000 mls. of hot glacial acetic acid.

The solution is heated to 90°–100° C. whereupon 65 mls. of hydrogen peroxide (35%) are added with stirring. The mixture is kept boiling slowly during two hours. Again 65 mls. of hydrogen peroxide (35%) are added and boiling is continued for another two hours. Finally 50 mls. of hydrogen peroxide (35%) are added and the reaction is completed in 1½ hours. After cooling and standing overnight, the crystals formed are filtered washed with methanol and dried. Yield: 22 grams of 2,2'-sulfonyl-bis(3,4,6-trichlorophenol).

The following specific examples, which are not intended to be restrictive, only serve to illustrate the methods of treating animals suffering from fascioliasis in accordance with the invention.

*Example 6*

A number of rabbits intentionally infected with liver-fluke, are treated with a single dose of 25 mg./kg. of 2,2'-sulfonyl-bis(3,4,6-trichlorophenol) in the form of a suspension as prepared according to Example 2 or 3.

After 48 hours the livers of the animals are tested and appear to contain only killed liver-flukes.

*Example 7*

A group of five sheep, the faeces of which contain from 30–435 liver-fluke eggs per gram, are treated with a single dose of 15 mg./kg. of 2,2'-sulfonyl-bis(3,4,6-trichlorophenol) in the form of a preparation according to the present invention.

After two weeks the faeces of the treated animals are free from eggs of the parasite.

Two months after treatment, the sheep are sacrificed and their livers tested. They no longer contain liver-flukes.

*Example 8*

A number of rabbits, intentionally infected with liver-rot, are treated with a single dose of 50 mg./kg. of 2,2'-sulfinyl-bis(3,4,6-trichlorophenol) in the form of a tragacanth/gum arabic suspension as prepared analogous to Example 2.

After 48 hours the livers of the treated animals are tested and found to contain killed liver-flukes only.

*Example 9*

Similar tests as described in Example 8, are made with 2,2'-sulfonyl-bis(4,6-dichlorophenol). It is found that the livers of the treated animals do not contain any viable liver-flukes 72 hours after a single treatment with 50 mg./kg. of the active principle.

What is claimed is:

1. A method of treating animals infected with fascioliasis, consisting essentially in orally administering to an animal infected with fascioliasis therapeutically effective amounts of an anthelmintic composition having, as its essential active component, a chlorinated bisphenol of the formula:

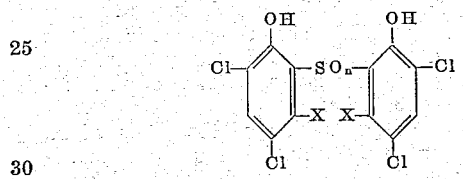

in which X is selected from the group consisting of hydrogen and chlorine, and $n$ has a numerical value of 1, when X represents hydrogen, and a numerical value in the range from 1 to 2, when X represents chlorine.

2. The method as in claim 1; wherein said chlorinated bisphenol is 2,2'-sulfonyl-bis(3,4,6-trichlorophenol).

3. The method as in claim 1; wherein said chlorinated bisphenol is 2,2'-sulfinyl-bis(3,4,6-trichlorophenol).

4. The method as in claim 1; wherein said chlorinated bisphenol is 2,2'-sulfonyl-bis(4,6-dichlorophenol).

5. A composition for combating fascioliasis in animals comprising as its essential active ingredient an effective amount of 2,2'-sulfonyl-bis(3,4,6-trichlorophenol) and a carrier therefor.

References Cited by the Examiner

UNITED STATES PATENTS

| | | | |
|---|---|---|---|
| 2,768,211 | 10/56 | Towne | 260—607 |
| 2,860,168 | 11/58 | Erickson | 260—607 |
| 3,080,282 | 3/63 | Shunk | 167—53 |
| 3,098,006 | 7/63 | Soder | 167—53 |

FOREIGN PATENTS 165,526  2/53  Australia.

OTHER REFERENCES

Gump: J.A.C.S., vol. 67, February 1945, pages 238 and 240.

U.S. Dispensatory, 25th edition, 1955, Lippincott Co., Philadelphia, Pa., pages 1–4, 1037 and 1264.

Enzie: Am. J. Vet. Research, vol. 21, pages 624–627 (1960); abstracted in Chem. Abst., vol. 54, 1960, page 18,787e.

JULIAN S. LEVITT, *Primary Examiner.*

FRANK CACCIAPAGLIA, JR., *Examiner.*